US012361779B2

(12) United States Patent
Savill

(10) Patent No.: US 12,361,779 B2
(45) Date of Patent: Jul. 15, 2025

(54) LOCALISED, LOOP-BASED SELF-LEARNING FOR RECOGNISING INDIVIDUALS AT LOCATIONS

(71) Applicant: LOOPLEARN PTY LTD, Mittagong (AU)

(72) Inventor: David Savill, Mittagong (AU)

(73) Assignee: LOOPLEARN PTY LTD, Mittagong (AU)

( * ) Notice: Subject to any disclaimer, the term of this patent is extended or adjusted under 35 U.S.C. 154(b) by 495 days.

(21) Appl. No.: 17/612,044

(22) PCT Filed: May 18, 2020

(86) PCT No.: PCT/IB2020/054669
§ 371 (c)(1),
(2) Date: Nov. 17, 2021

(87) PCT Pub. No.: WO2020/234737
PCT Pub. Date: Nov. 26, 2020

(65) Prior Publication Data
US 2022/0254160 A1    Aug. 11, 2022

(30) Foreign Application Priority Data
May 18, 2019    (AU) ................. 2019901684

(51) Int. Cl.
*G07C 9/28*    (2020.01)
*G06N 3/088*    (2023.01)
(Continued)

(52) U.S. Cl.
CPC ............ *G07C 9/28* (2020.01); *G06N 3/088* (2013.01); *G06V 10/82* (2022.01); *G06V 20/30* (2022.01);
(Continued)

(58) Field of Classification Search
None
See application file for complete search history.

(56) References Cited

U.S. PATENT DOCUMENTS

| 7,734,626 B2 * | 6/2010 | Jaehnig | G06Q 50/00 |
| | | | 707/736 |
| 10,755,106 B1 * | 8/2020 | Bakry | G06V 40/103 |

(Continued)

FOREIGN PATENT DOCUMENTS

| JP | 2011150497 A | 8/2011 |
| JP | 2018163524 A | 10/2018 |

(Continued)

OTHER PUBLICATIONS

T. Srivastava, V. Vaish, P. Sharma and P. Khanna, "Implementing Machine Learning for Face Recognition based Attendance Monitoring System," Mar. 13-15, 2019 6th International Conference on Computing for Sustainable Global Development (INDIACom), New Delhi, India, 2019, pp. 1254-1259. (Year: 2019).*

(Continued)

*Primary Examiner* — Amir Alavi
(74) *Attorney, Agent, or Firm* — Ruggiero McAllister & McMahon LLC

(57) ABSTRACT

A method for recognising individuals at a location may include: locally capturing images of individuals at the location; locally recognising individuals in the images by a local recogniser trained with local; training data for individuals previously recognised, or expected to be, at the location; for individuals that initially cannot be locally recognised, retrieving additional training data from a remote recogniser using query data extracted from the images by the local recogniser; updating the local training data with the additional training data; retraining the local recogniser with the updated local training data to locally recognise the individuals that initially could not be locally recognised, and wherein
(Continued)

the local training data, query data and additional training data comprise embeddings extracted from images of individuals.

8 Claims, 2 Drawing Sheets

(51) Int. Cl.
| | |
|---|---|
| *G06V 10/82* | (2022.01) |
| *G06V 20/30* | (2022.01) |
| *G06V 20/52* | (2022.01) |
| *G06V 40/10* | (2022.01) |
| *G06V 40/16* | (2022.01) |

(52) U.S. Cl.
CPC .............. *G06V 20/53* (2022.01); *G06V 40/10* (2022.01); *G06V 40/172* (2022.01); *G06V 40/173* (2022.01)

(56) References Cited

U.S. PATENT DOCUMENTS

| | | | | |
|---|---|---|---|---|
| 2003/0198368 | A1 | 10/2003 | Kee | |
| 2016/0188598 | A1* | 6/2016 | Moser | G06F 3/0482 707/723 |
| 2016/0350587 | A1* | 12/2016 | Bataller | G06V 20/49 |
| 2018/0322333 | A1* | 11/2018 | Lacewell | G06V 10/82 |
| 2019/0037638 | A1* | 1/2019 | Kasaragod | H04L 67/10 |
| 2019/0138748 | A1* | 5/2019 | Long | H04N 7/183 |
| 2019/0278895 | A1* | 9/2019 | Streit | G06V 40/45 |
| 2019/0278976 | A1* | 9/2019 | Khadloya | G08B 13/19656 |

FOREIGN PATENT DOCUMENTS

| | | |
|---|---|---|
| KR | 1020160116678 A | 10/2016 |
| KR | 1020180074565 A | 7/2018 |

OTHER PUBLICATIONS

Puthea et al., "A review paper on attendance marking system based on face recognition," 2017 2nd International conferences on Information Technology, Information Systems and Electrical Engineering (ICITISEE), Yogyakarta, Indonesia, 2017, pp. 304-309, doi: 10.1109/ICITISEE.2017.8285517 (Year: 2017).*
S. Sawhney, K. Kacker, S. Jain, S. N. Singh and R. Garg, "Real-Time Smart Attendance System using Face Recognition Techniques," 2019 9th International Conference on Cloud Computing, Data Science & Engineering (Confluence), Noida, India, 2019, pp. 522-525, doi: 10.1109/CONFLUENCE.2019.8776934 (Year: 2019).*
Castillo et al., "Class attendance generation through multiple facial detection and recognition using artificial neural network," Proceedings of the 2018 International Conference on Machine Learning and Machine Intelligence, Sep. 2018. doi: 10.1145/3278312.3278320 (Year: 2018).*
S. A. Miraftabzadeh, P. Rad, K.-K. R. Choo and M. Jamshidi, "A Privacy-Aware Architecture at the Edge for Autonomous Real-Time Identity Reidentification in Crowds," in IEEE Internet of Things Journal, vol. 5, No. 4, pp. 2936-2946, Aug. 2018, doi: 10.1109/JIOT.2017.2761801 (Year: 2018).*
Korean Intellectual Property Office, "International Preliminary Report on Patentability," International Application No. PCT/IB2020/054669, Sep. 7, 2021.
Korean Intellectual Property Office, "International Search Report and Written Opinion," International Application No. PCT/IB2020/054669, Aug. 14, 2020.

* cited by examiner

LOCALISED, LOOP-BASED SELF-LEARNING FOR RECOGNISING INDIVIDUALS AT LOCATIONS

CLAIM FOR PRIORITY

This application is a national stage entry of international application PCI/IB2020/054669, filed on May 18, 2020 and titled LOCALISED, LOOP-BASED SELF-LEARNING FOR RECOGNISING INDIVIDUALS AT LOCATIONS ("the '669 PCT Application"), filed under 35 U.S.C. § 371. The '669 PCT Application claims the benefit of priority to the May 18, 2019 filing date of AU Provisional Patent Application No. 2019901684 ("the '684 Provisional Application"). The entire disclosures of the '684 Provisional Application and the '669 PCT Application are hereby incorporated herein.

FIELD

The present invention relates to localised, loop-based self-learning for recognising individuals at locations for applications such as real-time attendance monitoring, access control, people counting, etc.

BACKGROUND

Attendance monitoring, access control, and people counting of individuals at educational, health care, aged care, child care, commercial, and public locations are usually performed manually. Client-server computer systems for recognising individuals at locations, such as cloud-based biometric or facial recognition systems, have also recently been proposed.

Conventional manual and computerised approaches to recognising individuals for attendance monitoring, access control, and people counting suffer from several drawbacks. Manual attendance tracking is labour-intensive, time-consuming, and prone to circumvention and inaccuracy. Cloud-based attendance tracking systems have attracted concerns about cost, privacy, and data security.

In view of this background, there is an unmet need for improved solutions for recognising individuals at locations.

SUMMARY

According to the present invention, there is provided a method for recognising individuals at a location, the method comprising:
  locally capturing images of individuals at the location;
  locally recognising individuals in the images by a local recogniser trained with local training data for individuals previously recognised, or expected to be, at the location;
  for individuals that initially cannot be locally recognised, retrieving additional training data from a remote recogniser using quern data extracted from the images by the local recogniser;
  updating the local training data with the additional training data;
  retraining the local recogniser with the updated local training data to locally recognise the individuals that initially could not be locally recognised.

The local recogniser may self-learn to locally recognise individuals in the images at the location using an iterative loop that updates and refines the local training data with additional training data from the remote recogniser.

The local recogniser may self-update and self-refine the local training data with additional training data for individuals that are routinely locally recognised in the images at the location.

The local training data may be periodically updated with additional training data from the remote recogniser based on calendar, timetable or scheduling data for individuals expected to be at the location.

The method may further comprise periodically writing over and refreshing the local training data so that only newest or most recent local training data for individuals expected to be at the location is retained.

The local training data, query data and additional training data may comprise embeddings or object recognition data extracted from images of the individuals.

The local recogniser may locally recognise individuals in the images by one or both of embedding-based recognition and object recognition. For example, the local recogniser may initially perform embedding-based recognition of individuals in the images until object recognition of the individuals can be performed.

The local recogniser and remote recogniser may comprise convolutional neural networks (CNNs).

The images of the individuals may be captured at the location in zones representing same or similar contexts, distances, angles, or lighting conditions.

The local training data may be context specific to the location.

The local recogniser may perform context aware local recognition of individuals at the location using the context specific local training data.

The method may further comprise monitoring attendance of individuals at the location using the local recogniser.

The images of the individuals may be locally captured by a local image capture device located at the location.

The local recogniser may be locally executed by a local processor located at the location.

The local training data may be locally stored in local storage accessible by the local processor.

The local image capture device, local processor and local storage may be integrated in a local device that has a single form factor, and which is physically located at the location.

The local device may be selected from a group comprising a wall sensor, a portal sensor, a self-serve kiosk, and an unattended kiosk.

The method may further comprise automatically deleting, overwriting or disabling the local training data if the local device is powered off or interfered with.

The location may comprise an indoor or outdoor location. The indoor location may, for example, be selected from a group comprising school or college classrooms, residents' rooms, communal recreation and/or learning spaces, lounges, dining halls, and auditoriums.

The images may comprise whole or part body images of the individuals at the location.

The images may be captured continuously.

The local image capture device may track movement of the individuals at the location so that only images suitable for local recognition are captured.

The present invention also provides a system for recognising individuals at a location, the system comprising one or more processing devices and one or more storage devices storing instructions that, when executed by the one or more processing devices, cause the one or more processing devices to:
  locally recognise individuals in locally captured images of the location by a local recogniser trained with local training data for individuals previously recognised, or expected to be, at the location;

for individuals that initially cannot be locally recognised, retrieve additional training data from a remote recogniser using query data extracted from the images by the local recogniser;

update the local training data with the additional training data;

retrain the local recogniser with the updated local training data to locally recognise the individuals that initially could not be locally recognised.

BRIEF DESCRIPTION OF DRAWINGS

Embodiments of the invention will now be described by way of example only with reference to the accompanying drawings, in which.

DESCRIPTION OF EMBODIMENTS

Figure 1:
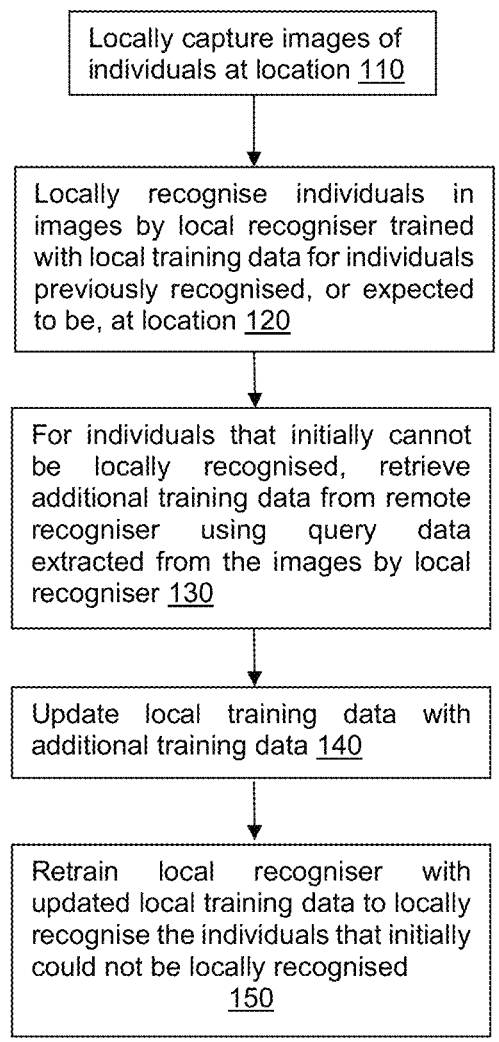
FIG. 1 is a flow diagram of a method of recognising individuals at a location according to an embodiment of the present invention.

Referring to FIG. 1, a method 100 for recognising individuals at a location according to an embodiment of the invention may start at step 110 by locally capturing images of individuals at the location.

Next, at step 120, individuals in the images may be locally recognised by a local recogniser trained with local training data for individuals previously recognised, or expected to be, at the location.

For individuals that initially cannot be locally recognised, the method 100 may move to step 130 by retrieving additional training data from a remote recogniser using quern data extracted from the images by the local recogniser. The local recogniser and remote recogniser may comprise fully CNNs.

At step 140, the local training data may be updated with the additional training data. The method 100 may end at step 150 by retraining the local recogniser with the updated local training data to locally recognise the individuals that initially could not be locally recognised.

The local training data, query data and additional training data may comprise embeddings or object recognition data extracted from images of the individuals. "Embeddings" may comprise mathematical vectors representing features extracted from parts of the images "Object recognition data" may comprise data representing objects extracted from the images. The local recogniser may locally recognise individuals in the images by one or both of embedding-based recognition and object recognition. For example, the local recogniser may initially perform embedding-based recognition of individuals in the images until object recognition of the individuals can be performed with a predetermined sufficient accuracy. Along with being able to identify generic objects, such as face or body objects, object recognition may also identify unique individuals.

The local recogniser may use real time object recognition models using fully CNNs. The object recognition models may also provide the identity of a person it has been trained on. The geometric features of faces or bodies may be subsequently extracted from the images using, for example, a machine learning algorithm such as a CNN where its parameters are trained using a loss function such as additive angular margin loss. The features of faces or bodies extracted from the images may, for example, be selected from a group comprising facial features, pose features, gait features, age features, activity/movement features, standing position features, sitting position features, and seating location features. The detection and extraction of non-face features may open the possibility that face recognition can be augmented by other systems. For example, if a face cannot be recognised, it may be possible to recognise an individual based on where they sit (historically or habitually), their gait, their posture or other identifying features of the individual's body. In addition, the ability to detect and extract features of faces or bodies from the images relating to age of individuals is advantageous in applications such as child care where an important legal requirement is that a correct number of adults be present at the location for a given number of children present. This may also be used in aged care where it is important to know how recently a resident has been visited by a staff member.

The local recogniser may self-learn to locally recognise individuals in the images at the location using an iterative loop that updates and refines the local training data with additional training data and/or reinforcements from the remote recogniser. The local recogniser may also self-update and self-refine the local training data with additional training data for individuals that are routinely locally recognised in the images at the location. Such updates may be self-determined by the local recogniser where it meets a threshold for an individual it routinely observes who were not locally recognised by the local recogniser. The training of the local object recognition model may be performed by a local machine learning training engine if the local recogniser is idle, or the training may be performed by a remote machine learning training engine and the result returned to the local recogniser.

The local recogniser may be configured to locally recognise the individuals in the images of the location in a machine-learning, self-learning or loop-based mode based on the periodic updates of the local training data, and periodic updated training of the local recogniser. The images of the individuals may be captured at the location in zones representing same or similar contexts, distances, angles, or lighting conditions. The local training data may therefore be context specific to the location. The local recogniser may perform context aware local recognition of individuals at the location using the context specific local training data.

The local recogniser may therefore self-learn individuals in the context of the location, such as a room, in which the individuals are seated, thereby allowing for high recognition accuracy by the local recogniser. In addition, the local object recognition data or local embeddings generated by the local recogniser for each individual may be unique to the local recogniser taking into consideration all local environmental factors. The local recogniser may therefore self-learn individuals in the context of the location, such as a room, which it sits in, allowing for high local recognition accuracy. The method 100 may, for example, further comprise monitoring attendance of individuals at the location using the local recogniser. The local embeddings of the individuals may be clustered in a local datastore by zone information, tracking information, and from reinforcement information provided from the remote recogniser so that embeddings in the local datastore maintain maximum separation.

The local training data may be periodically updated with additional training data from the remote recogniser based on calendar, timetable or scheduling data for individuals expected to be at the location. For example, the local training data may be updated with additional training data based on a known schedule of which individuals might be in the room where the local recogniser is located. This may be a school timetable, a visitation schedule, an outlook calendar, or any other scheduling information. For example, someone could invite an external guest to a meeting, and the local training data may be updated with additional training data for the guest by a local recogniser which handles visitor sign in at reception.

The images of the individuals may be locally captured by a local image capture device, for example one or more cameras or image sensors, located at the location. The local recogniser may be locally executed by a local processor located at the location. The local training data may be locally stored in local storage accessible by the local processor. The local image capture device, local processor and local storage may be integrated in a local device that has a single form factor, and which is physically located at the location. The local device may be selected from a group comprising a wall sensor, a portal sensor, a self-serve kiosk, and an unattended kiosk. The method 100 may further comprise automatically deleting, overwriting or disabling the local training data if the local device is powered off or interfered with.

The location may comprise an indoor or outdoor location. The indoor location may, for example, be selected from a group comprising school or college classrooms, residents' rooms, communal recreation and/or learning spaces, lounges, dining halls, and auditoriums.

The images may comprise whole or part body images of the individuals at the location. The images may be captured continuously. The image capture device may track movement of the individuals at the location so that only images suitable for local recognition are captured. In other words, the individuals may be tracked during the detection phase and if an image is found but is unsuitable for recognition (e.g., due to low image quality or the face or body is not in a suitable pose), the local device may track the individual until a recognition event is possible. This tracking capability may address situations where the image quality was poor when the local device might have seen an individual for the first time. Instead, the local device may now track an individual and only send the image of their face to the local recogniser or remote recogniser when a good enough version of the individual has been seen. For example, an individual person may first be seen in profile (or side on), and then turn towards the camera for a moment. Tracking allows the individual to be followed until this moment when a high-quality recognition event can be performed.

The method 100 may further comprise periodically writing over and refreshing the local training data so that only newest or most recent local training data for individuals expected to be at the location is retained in local storage on the local device.

Figure 2:
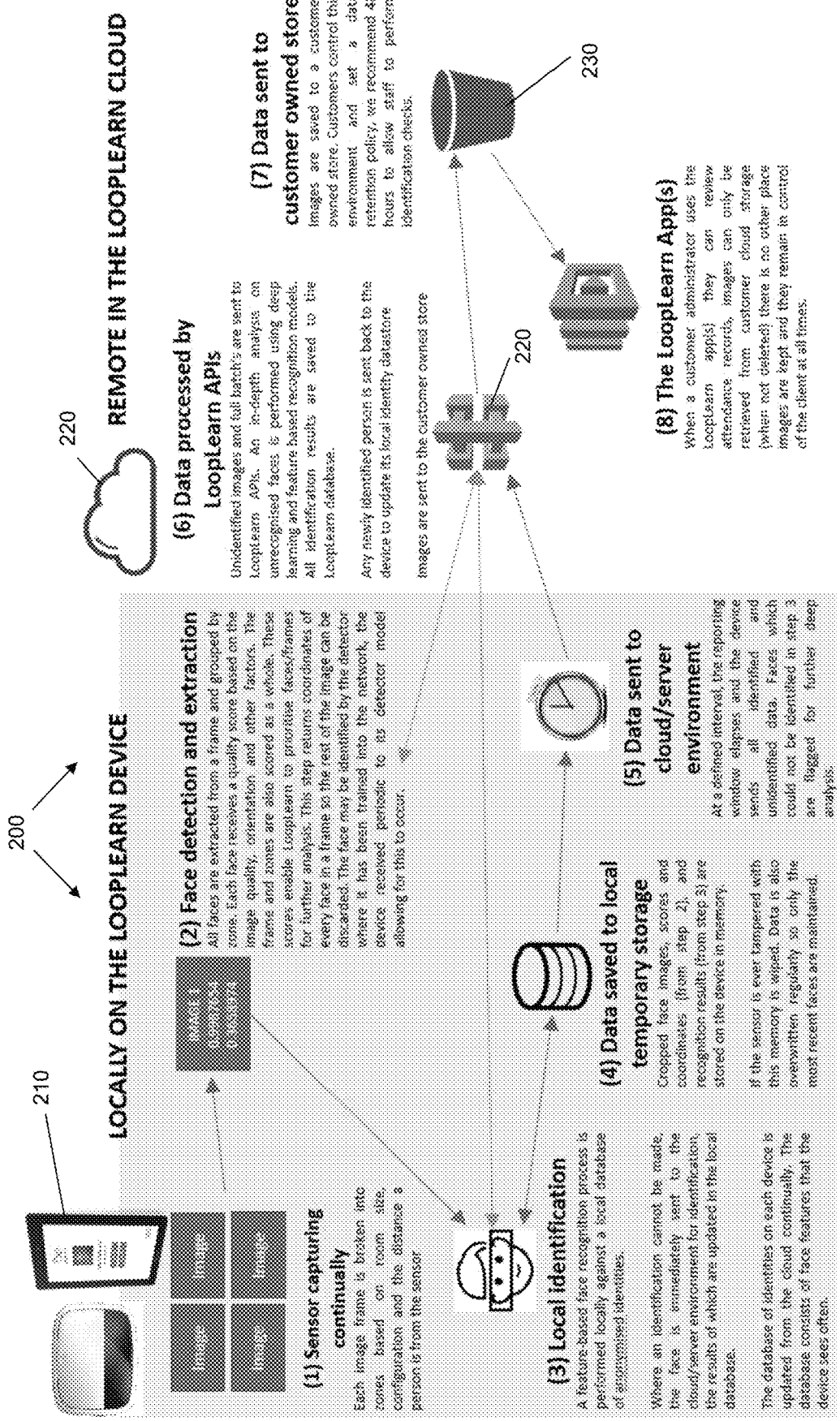
FIG. 2 is a system architecture and dataflow diagram of a system for performing the method of FIG. 1.

FIG. 2 illustrates an embodiment of a computer system 200 for performing the method 100. The system 200 may generally comprise a local device 210, a remote server 220, and a remote datastore 230. The remote server 220 may comprise a cloud server, and the remote datastore may comprise a cloud datastore. The cloud server 220 may, for example, be operated by a provider of the local image capture and processing device 210, and the cloud datastore may, for example, be operated by a customer of the local device 210 who controls access to, or operation of, the location. The local device 210 may be configured to periodically perform one or more of the above steps of the method 100 in batches.

As described above, the local device 210 may comprise one or more of the following:

- wall sensors—a small device on a wall or in a corner which sees people in an entire room,
- portal sensors—a small device on a wall or door frame, near a portal, which sees people entering or exiting that portal, (eg, a doorway);
- self-serve kiosks—a touch screen interactive device where the person provides information about why they are here; and
- unattended kiosks—a large screen device which shows to the person them being detected but they do not need to interact with the screen/system (ie, this is essentially a visual version of the portal sensor).

Wall sensors may be configured to sit on a wall in a room and observe the entire room and report back individuals who have been present. As such, they may replace what would have traditionally been multiple security cameras feeding back to a server or a manual attendance reporting process. The wall sensor may be constantly detecting individuals in the room and analysing them periodically in batches that may be up to 10 minutes long as selected by a user. Each batch may be processed as follows.

1. The local device 210 may have received a list of embeddings for faces it is likely to encounter based on scheduling information for that room
2. Multiple images of the room are taken every second (ie, enough to see the entire room).
3. Each image is processed and faces and bodies are detected by object recognition.
4. The local recogniser executed by the local device 210 may provide an identification of the person.
5. Features of each face and/or body may be extracted from the image.
6. Embeddings representing the face and body geometric features are extracted for each person.
7. The local recogniser identities and embeddings are tracked against object recognition identities and embeddings created from previous images taken for the same room to determine if the face and/or body is the same person that has been seen previously.
8. Embeddings, along with their metadata, are grouped into vertical zones, which represent groupings of individuals at the same distance from the sensor.
9. The object recognition process may have identified the person if that person were trained into the detection model, also, each face is identified against a local, on-device, in-memory datastore of embeddings.
10. If the individual cannot be identified locally, then a request is made of a remote recogniser engine as to who the person is:
   a. if known, the local database of known individuals is updated; or
   b. if unknown, the image is catalogued to the cloud and local database with an unknown identity (to be confirmed later by a user).
11. Known and unknown representative images of each person are stored in memory until the end of the batch.
12. Steps 2-11 are repeated until the batch ends.
13. The local device 210 sends the batch processed data to the cloud.

Portal sensors may be configured to operate in a similar manner to wall sensors, except that.

a. their batch times may be lowered to around 1 minute making the reporting to the cloud on who they have seen quicker; and b. they only have one camera which is directed to a portal entry way (eg, a door). The portal sensors may identify and catalogue individuals in the same way as the wall sensor.

Self-serve kiosks may be used for visitor registration, event registration, and for staff/student sign in/out. They may be used when the person in question needs to provide information after they have been identified. The self-serve kiosk may identify and catalogue people in the same way as the wall sensor except that there is no batch mode. Instead, identities of individuals may be transmitted immediately along with the data the person is prompted to enter. A self-serve kiosk may also be interfaced with other external physical devices to provide access control, such as controlling the magnetic lock of a door.

Unattended kiosks may comprise a hybrid between portal sensors and self-serve kiosks. They provide the same functionality as the portal sensors as well as providing a visual key or cue when a successful identification is made. For example, this may be provided by drawing red, yellow and green boxes around people's faces as they walk by the kiosk indicating they have been seen, are being processed, and have finally been identified. The unattended kiosk may identify and catalogue people in the same way as the wall sensor. Again, a kiosk may also be interfaced with other external physical devices to provide access control, such as controlling the magnetic lock of a door.

Embodiments of the present invention provide a hybrid on-device and cloud-based (or hybrid local and centralised computing) method and system that is both generally and specifically useful for determining presence or absence of individuals at educational, aged care, commercial, and public locations. Although some embodiments of the invention have been described above in the context of applications for attendance monitoring at educational locations, such as school classroom roll taking, it will be appreciated that other embodiments of the invention may be implemented for alternative applications, such as access control, people counting, etc, for commercial and public locations. Embodiments of the invention may, also be directly suited to attendance taking in locations other than schools, such as child care and aged care facilities.

Embodiments of the local device of the present invention may advantageously "self-learn" people they come across. Consequently, they do not need to be pre-populated with large databases of people, and they do not need any permanent local data storage making them very secure. The local device may only keep the data (in memory) for people it regularly sees, and in the context in which it seems them. People that are new or that it has "forgotten" may be sent to the remote recogniser to be remotely recognised as needed. Thus, there is no need to store data for people who are not commonly seen by the device. The local device may keep all data in memory, not on permanent storage, which means if it is ever powered off or tampered with, all sensitive information may be wiped automatically. In addition, the local datastore may be routinely written over such that only newest entries are maintained. In addition, the hybrid edge and centralised computing model ensures that processing by the local device remains fast and computational efficient, as it only needs to remember a small group of people. It also makes it easier to enroll identities of individuals as the local device does not need to be pre-populated.

Embodiments of the present invention provide a method and system that are both generally and specifically useful for localised, loop-based self-learning for recognising individuals at locations for applications such as real-time attendance monitoring, access control, people counting, etc.

For the purpose of this specification, the word "comprising" means "including but not limited to," and the word "comprises" has a corresponding meaning.

The above embodiments have been described by way of example only and modifications are possible within the scope of the claims that follow.

The invention claimed is:

1. A system for recognising individuals at a location, the system comprising:
    a cloud database storing remote recognition data identifying known individuals expected to be at the location; and
    a local computing device at the location configured to initially query local recognition data stored in a local database to initially determine if individuals at the location are known or unknown to the local computing device,
    wherein the initial query of the local recognition data is based on locally generated embeddings representing individuals at the location, and wherein the locally generated embeddings are locally generated based on locally captured images of individuals at the location;
    responsive to individuals being initially determined to be unknown, the local computing device is further configured to subsequently query, using query data extracted from the locally captured images, the remote recognition data to determine if individuals initially unknown to the local computing device are known in the cloud database; and
    responsive to individuals being determined, as a result of the subsequent query, to be known in the cloud database, the local computing device is further configured to retrieve, from the cloud database, updated local recognition data thereby to update the local computing device to recognise the initially unknown individuals as known individuals;
    wherein the local recognition data comprises locally stored embeddings representing individuals expected or previously identified at the location;
    wherein the local recognition data does not comprise locally stored images;
    wherein the initial query is based on comparing the locally stored embeddings to the locally generated embeddings;
    wherein the initial query is not based on comparing the locally captured images to locally stored images; and
    wherein the locally captured images are not permanently stored in the local database.

2. The system of claim 1, wherein the query data comprises embeddings extracted from images of individuals, or cropped face images extracted from images of individuals.

3. The system of claim 1, wherein the local computing device is further configured to recognise individuals at the location by iteratively querying and receiving responses from the local database and the cloud database.

4. The system of claim 3, wherein the local computing device is further configured to periodically iteratively query and receive responses for individuals at the location from the local database and the cloud database in batches.

5. The system of claim 1, wherein the local recognition data and the remote recognition data comprise embeddings extracted from images of individuals.

6. The system of claim 5, wherein the updated local recognition data comprises embeddings extracted from images of individuals.

7. A local computing device, comprising:

a camera adapted to capture images of individuals at a location;

wherein the local computing device is adapted to:

store predetermined vectors representing individuals expected or previously identified at the location;

produce new vectors representing individuals at the location based on images captured by the camera that are not permanently stored on the local computing device;

identify individuals at the location based on comparing the new vectors to the predetermined vectors; and send the images or image metadata to a remote computing device for remote analysis, wherein the predetermined vectors stored at the local computing device are updated based on the remote analysis.

8. A method, comprising:

storing, at a local computing device, predetermined vectors representing individuals expected or previously identified at a location;

capturing, by a camera of the local computing device, images of individuals at the location;

producing, by the local computing device, new vectors representing individuals at the location based on images captured by the camera;

storing the images in memory that is not permanent storage on the local computing device;

identifying, by the local computing device, individuals at the location based on comparing the new vectors to the predetermined vectors;

sending the images or image metadata to a remote computing device for remote analysis; and updating the predetermined vectors stored at the local computing device based on the remote analysis.

* * * * *